United States Patent [19]

Tarner

[11] Patent Number: 4,614,252

[45] Date of Patent: Sep. 30, 1986

[54] PORTABLE OBSERVATION STRUCTURE

[76] Inventor: David E. Tarner, Rte. 1, Box 114, Nahunta, Ga. 31553

[21] Appl. No.: 795,887

[22] Filed: Nov. 8, 1985

[51] Int. Cl.$^4$ .................... A01M 31/02; E06C 5/04
[52] U.S. Cl. ................................ 182/116; 182/127; 182/187
[58] Field of Search ............ 182/127, 116, 187, 129, 182/156

[56] References Cited

U.S. PATENT DOCUMENTS

| | | | |
|---|---|---|---|
| 1,960,588 | 5/1934 | Jorgensen | 182/127 |
| 2,035,537 | 3/1936 | Cowan | 182/127 |
| 3,057,431 | 10/1962 | George | 182/116 |
| 3,336,999 | 8/1967 | McSwain | 182/116 |
| 3,406,784 | 10/1968 | Jones | 182/127 |
| 4,113,055 | 9/1978 | Gleockler | 182/127 |
| 4,228,870 | 10/1980 | Beardsley | 182/127 |
| 4,257,490 | 3/1981 | Baudy | 182/116 |
| 4,408,680 | 10/1983 | Ross | 182/127 |

Primary Examiner—Reinaldo P. Machado
Attorney, Agent, or Firm—Arthur G. Yeager

[57] ABSTRACT

A portable observation structure removably attachable to a wheeled vehicle comprising two pairs of upright legs in a rectangular pyramidal arrangement, said legs being removably attachable to the rear portion of said vehicle, telescopically extensible legs internally slideable in the rear pair of said legs and adapted to be extended to the ground and to provide support for said structure, and a seat member attached to the upper end of said pyramidal arrangement. This structure is useful as an observation structure for a hunter, a lifeguard, or the like.

15 Claims, 11 Drawing Figures

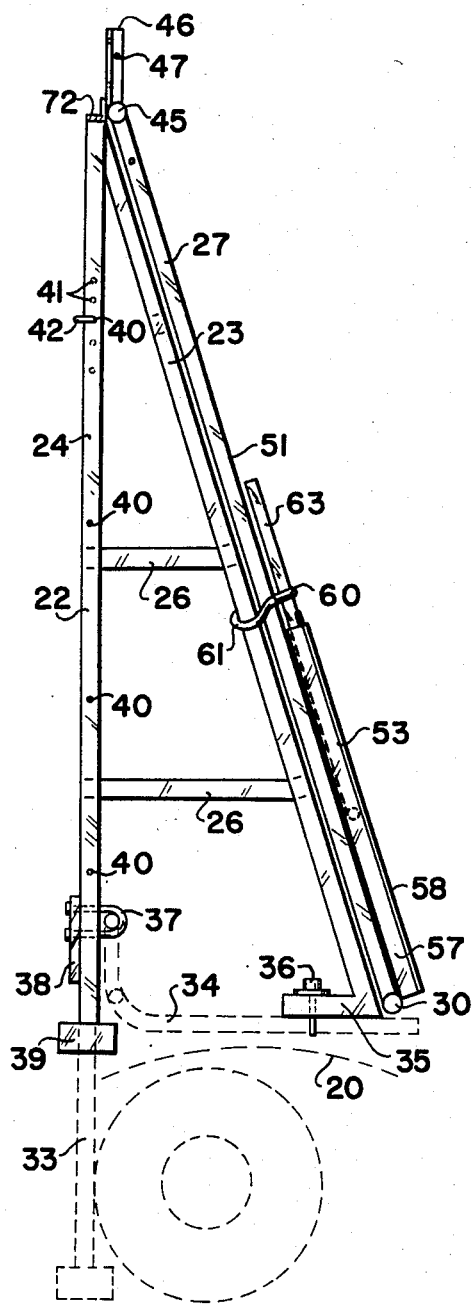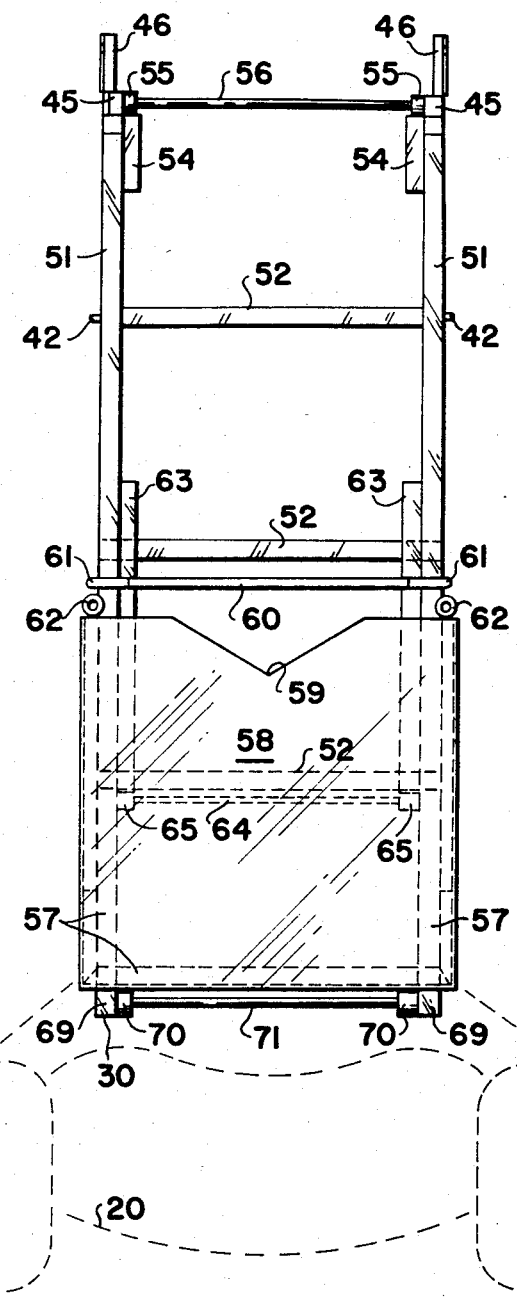
FIG 2
FIG 3

PORTABLE OBSERVATION STRUCTURE

BACKGROUND OF THE INVENTION

There are many places where a portable observation structure would be useful. Hunters, particularly deer hunters, frequently find it desirable to pick a position in the woods and await their quarry to pass by. Often the hunter prefers his position to be elevated, e.g., a platform in a tree, for a better view of the surrounding area. Permanent tree platforms require preparation and provide no flexibility in the selection of locations day after day. Attempts have been made to provide portable ladders with platform tops that can be placed against a tree, and temporarily fastened to the tree for stability. Such devices are disclosed in U.S. Pat. Nos. 3,057,431; 3,336,999; and 4,257,490. There also have been disclosed vehicles with ladders attached, e.g., in U.S. Pat. Nos. 1,960,588 and 2,035,537, but these have been restricted to agricultural and construction uses. There has never been disclosed, however, a suitable portable observation structure attachable to a small vehicle which would serve the hunter's needs or those of other types of observers, such as lifeguards.

It is an object of this invention to provide a portable observation structure for use by a hunter. It is another object of this invention to provide a portable ladder structure for observation purposes wherein the vehicle and ladder are readily moved about and easily set up for use as needed. Other objects will appear from the more detailed description which follows.

BRIEF DESCRIPTION OF THE INVENTION

This invention relates to a portable observation structure removably attachable to a wheeled vehicle comprising two pairs of upright legs in a rectangular pyramidal arrangement with the bottoms of each of the legs releaseably attachable to said vehicle, a first pair of legs attachable adjacent the rear of said vehicle and a second pair of legs attachable spacedly rearward of the first pair of legs, lateral rungs connecting said first pair of legs, telescopic extensions of said second pair of legs adapted to be selectively extended to reach the ground upon which the vehicle rests, said pyramidal arrangement having a seat member attached to the upper end thereof.

In specific embodiments of this invention an extension ladder of two legs and lateral rungs is pivotally connected to the top of the pyramidal structure, a foldable seat on the top of the extension ladder, and means for attaching the seat to a tree trunk to steady the seat and the ladder structure along with the ground support of the two telescopically adjustable legs.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a side elevational view of one embodiment of this invention.

FIG. 3 is a front elevational view of the embodiment of FIG. 2.

DETAILED DESCRIPTION OF THE INVENTION

Figure 10:
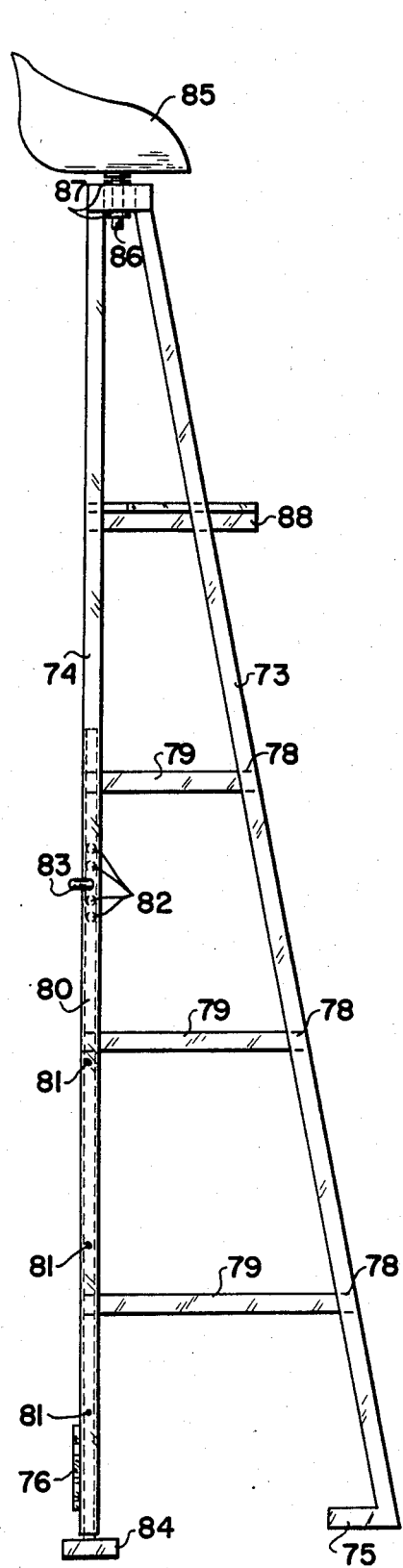
FIG. 10 is a side elevational view of a second embodiment of the observation structure of this invention.
Figure 11:
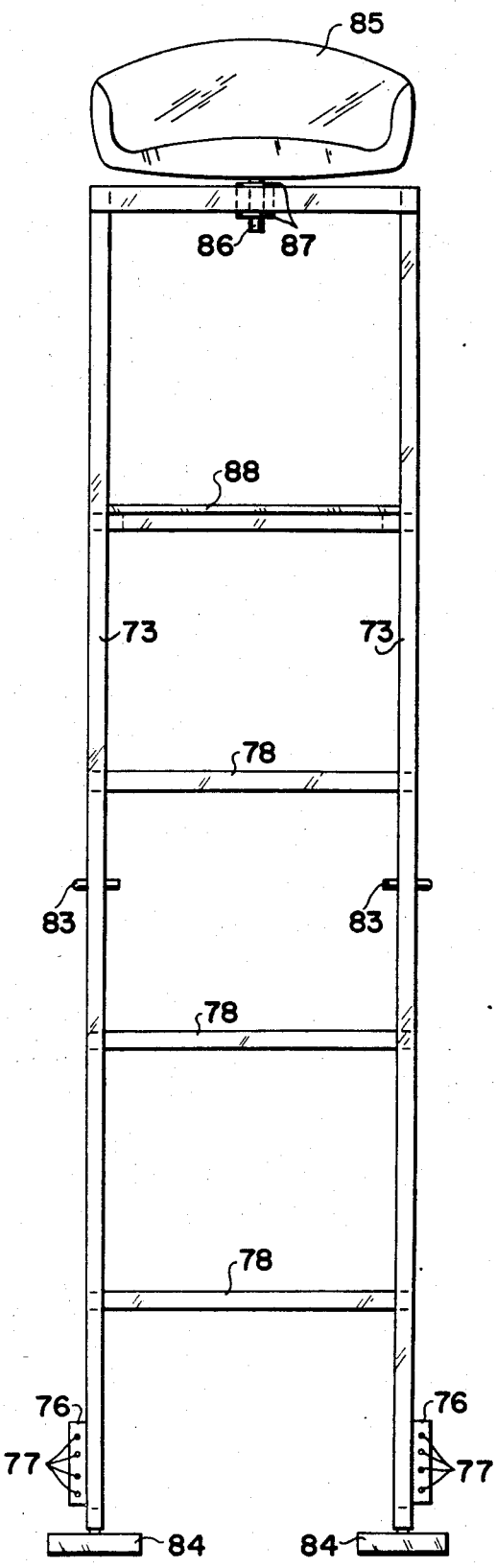
FIG. 11 is a front elevational view of the structure of FIG. 10.

This invention can be best appreciated by reference to the attached drawings. In FIGS. 1–7 there is shown one embodiment of the invention wherein the observation structure has two folding sections and is particularly suitable as a hunter's seat and stand. In FIGS. 10–11 there is shown a second embodiment wherein the ladder has a fixed single height and includes a standing platform, particularly suitable as a lifeguard stand.

Figure 1:
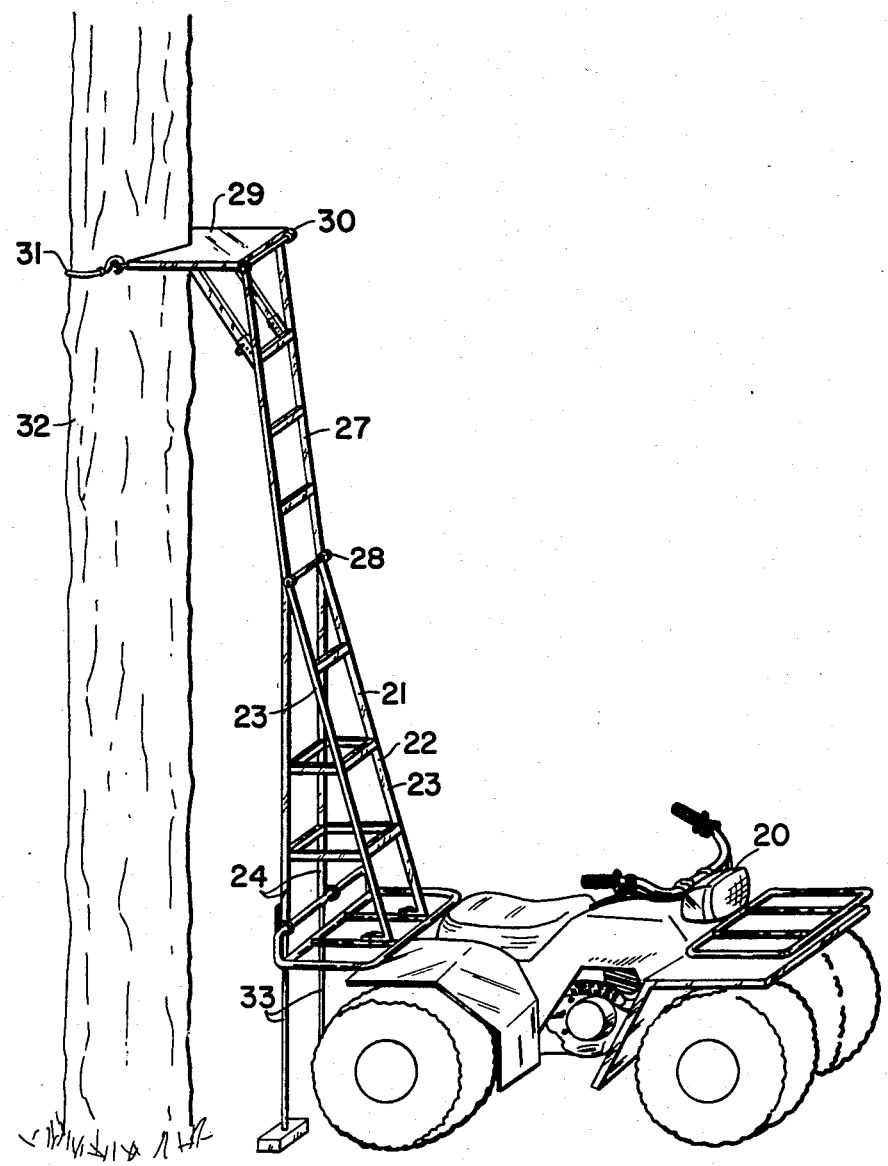
FIG. 1 is a perspective view of the portable observation structure of this invention extended to its full length and being supported by extension legs reaching the ground and by an encircling clamping belt around a tree trunk.
Figure 4:
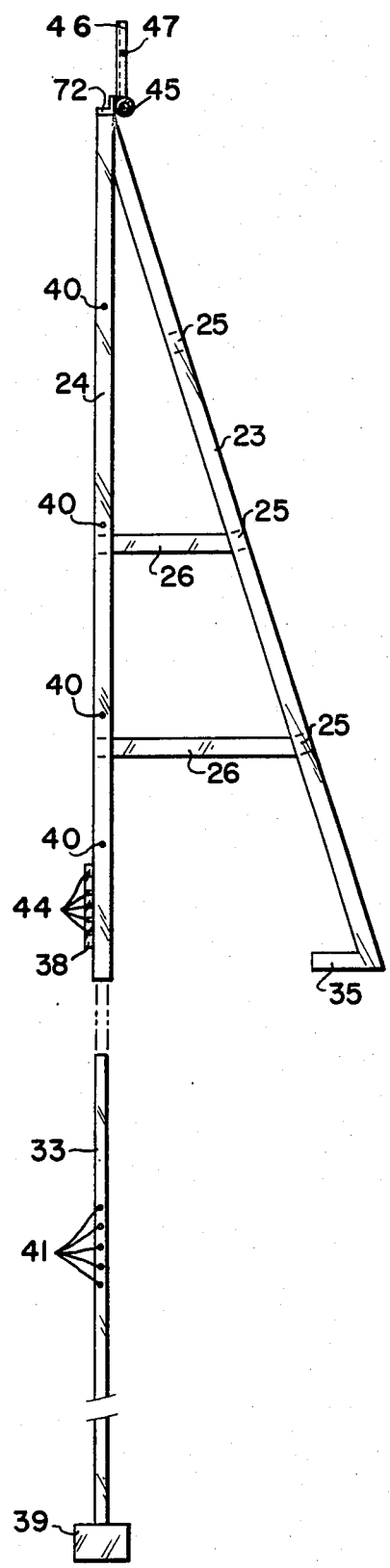
FIG. 4 is a side elevational view of the pyramidal ladder structure of the embodiment of FIGS. 2 and 3.
Figure 5:
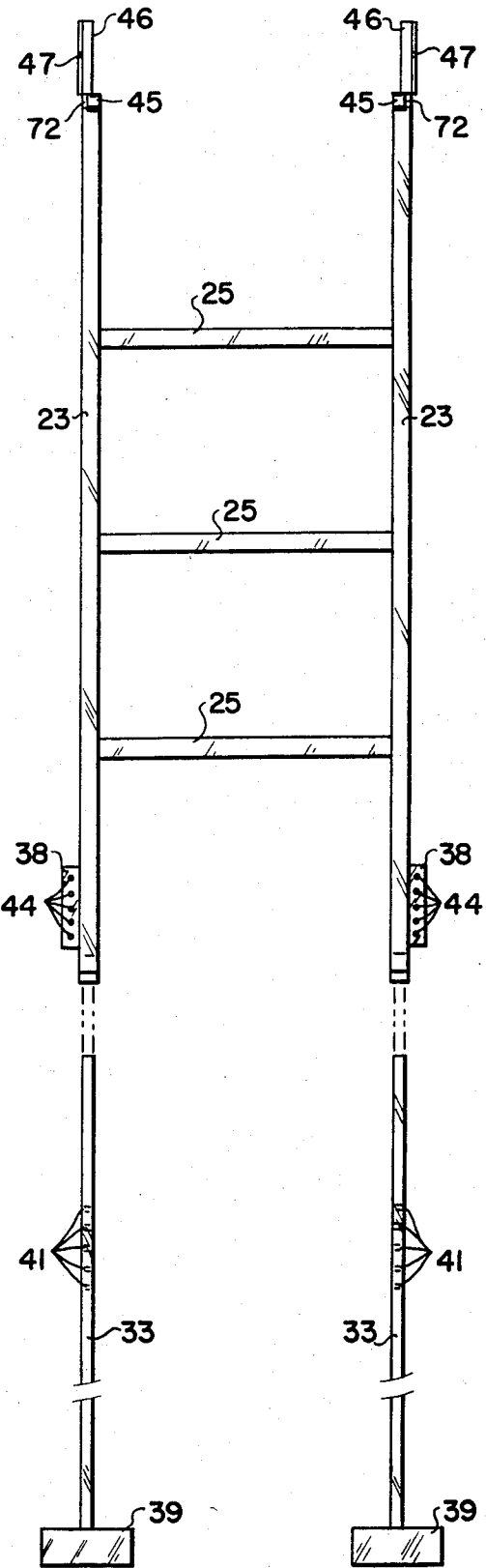
FIG. 5 is a front elevational view of the structure of FIG. 4.

In FIG. 1 a wheeled vehicle 20 is shown with the observation structure 21 mounted on the rear portion of vehicle 20. It is particularly advantageous if vehicle 20 is a small single seat, all-terrain vehicle of 3 or 4 wheels, so it may be driven over any type of terrain whether it be hilly hunting area with heavy vegetation, or onto a sandy beach, or whatever other terrain that can be traversed by a wheeled vehicle. It is, of course, entirely operable for this invention to include any other type of wheeled vehicle, e.g., a pick-up truck.

The lower portion 22 of this observation structure 22 is preferably one embodying four legs, a pair of front legs 23 and a pair of rear legs 24, in a rectangular pyramidal arrangement with rungs 25 attached laterally in a spaced arrangement to the pair of front legs 23. Lateral braces 26 may also be employed to stiffen the structure of lower portion 22. Extension ladder section 27 is attached to lower portion 22 by a pivotal connection 28 to permit extension section to be extended as shown or folded onto front pair of legs 23. Seat member 29 is pivoted at 30 to permit it to be folded out as shown or to be collapsed against ladder section 27. A flexible belt member 31 is attachable to seat 29 and adapted to encircle a tree trunk 32 to provide stability for seat 29 and extension ladder section 27. Lower section 21 has extension legs 33 which telescopically slide inside rear pair of legs 24 to reach the ground on which vehicle 20 rests and to provide additional stabilizing support for structure 21.

In FIGS. 2–5 there are shown the details of lower portion 22 of the observation structure of this invention. Front pair of legs 23 and rear pair of legs 24 are positioned in a rectangular pyramidal arrangement. Generally rear pair of legs 24 are substantially vertical and front pair of legs are placed at an angle thereto so as to have the tops of the legs together and the bottoms of the legs spread apart for stability. Lateral braces 26 provide stiffness to the structure. Ladder rungs 25 are spacedly attached to legs 23 to provide steps. While any convenient shape of rod or tube or strip can be used for the individual components of the structure, it is preferred to employ a square tubular material. The material of construction is preferably a metal, such as iron, steel, aluminum, or the like. Plastic tubing of sufficient stiffness is also acceptable. Welding of individual components to each other to form the finished structure is preferred. The structure is attached to vehicle 20 at any convenient location at the rear of vehicle 20. In the case of a 3- or 4-wheeled all-terrain small vehicle it is convenient to attach the observation structure to a luggage rack 34 of vehicle 20. The luggage rack is usually constructed of cylindrical tubing, and this makes it appropriate to secure the observation structure to the luggage rack by way of U-bolt fasteners. The bottom end of each of legs 23 is provided with a rearwardly directed foot 35 which is fastened to a portion of luggage rack 34 by U-bolt fastener 36. Rear legs 24 are also fastened to a portion of luggage rack 34 by U-bolt fasteners 37. A fastener plate 38 is welded to legs 24 and pierced with a plurality of holes 44 to provide adjustable attachments for U-bolts 37.

Figure 8:
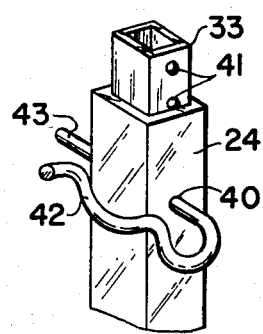
FIG. 8 is a perspective view of the spring clip fastening means for adjusting the extension legs.

In order to provide additional stability to the observation structure, particularly when it is attached to a small light weight vehicle, it is preferred to have rear legs 24 provided with internal, telescopically slideable extension legs 33. The length of legs 33 will depend upon the size of vehicle 20 and the distance above the ground where the bottoms of legs 23 and 24 are attached to vehicle 20. Each of legs 33 is provided with a broad foot 39 which will provide a large ground-engaging surface. Foot 39 might be a 2×4 piece of wood, a metal plate, or any other convenient supporting base which will resist penetrating the earth. Extension legs 33 are preferably a square tubing sliding inside of legs 24 in the form of square tubing. Such an arrangement prevents rotation of legs 33 with respect to legs 24 and thereby provides more stability for feet 39. The length of legs 33 in any particular environment is adjustable by means of the combination of any one of a plurality of holes 40 in rear legs 24 to be aligned with any one of a plurality of holes 41 in extension legs 33 and a spring clip 42 to maintain the selected holes in a fixed relationship. In FIG. 8 there is shown an enlarged broken section of leg 33 inside of leg 24 with spring clip 42 extending one of its arms 43 through an alignment of hole 40 and one of holes 41. Holes 40 and 41 may be positioned wherever needed for any particular vehicle 20.

Figure 9:
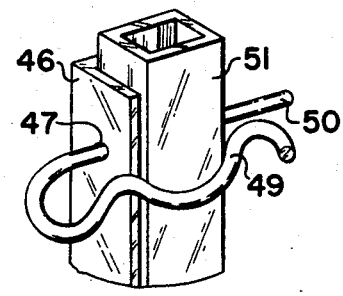
FIG. 9 is a perspective view of a spring clip used to fasten the extension ladder in the extended position.

At the upper end of lower portion 22 where front legs 23 and rear legs 24 are joined together there is provided a means for attaching extension ladder section 27. Bushings 45 are welded to the top ends of legs 23 and 24 so that a shaft may pass through bushings 45 and permit a pivotable connection between lower portion 22 and extension ladder section 27. It may be a convenient reinforcement to weld a short piece of angle beam support to the top of legs 24 to provide a better attachment for bushings 45. A short length of an angle structure forms a stop 46 for extension ladder section 27 when it is in the extended position. Hole 47 in angle stop 46 aligns with hole 48 in extension ladder section 27 and is secured by use of a spring clip fastener 49 as may be seen in the enlarged partial view in FIG. 9, where arm 50 extends through holes 47 and 48.

Figure 6:
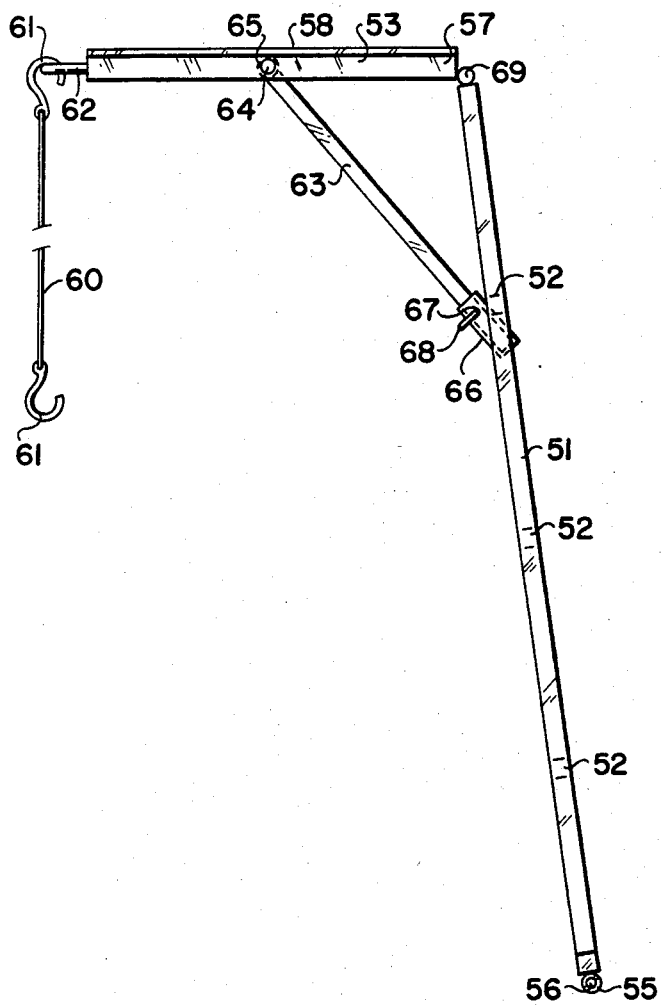
FIG. 6 is a side elevational veiw of the extension ladder section of the embodiment of FIGS. 2 and 3.
Figure 7:
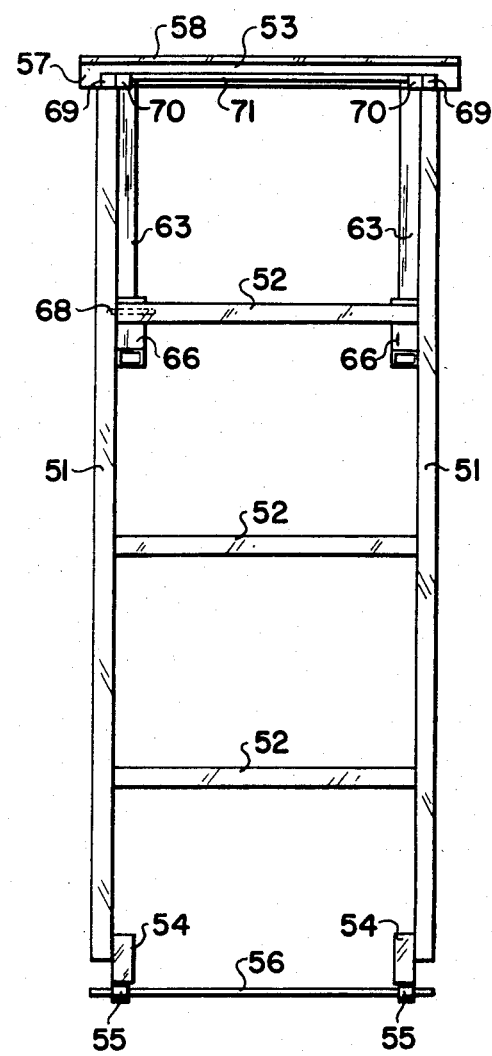
FIG. 7 is a front elevational view of the extension ladder section of FIG. 6.

Extension ladder section 27 is shown in FIGS. 2 and 3 folded against front legs 23 of lower portion 22. In FIG. 1 extension ladder section 27 is in its extended position. In FIGS. 6 and 7 extension ladder section 27 is shown in its extended position but is detached from lower portion 22 to show details of construction. Extension ladder section 27 comprises two vertical legs 51, a plurality of spaced lateral rungs 52, and a seat member 53. Legs 51 and rungs 52 are preferably square tubular metal pieces welded together, as discussed above with respect to lower portion 22. At the bottom of each of legs 51 there is an offset leg stub 54 to which is attached bushing 55 and a shaft 56. Bushings 55 and shaft 56 are operatively connected to bushings 45 of lower portion 22 so as to provide a pivotable connection. It will be seen that in order for legs 51 to fold intimately against legs 23 it is necessary for the lower end of legs 51 to be offset; hence the reason for stub legs 54.

At the upper end of legs 51 there is a foldable seat member 53 comprising an under support 57 of angle beam structure and a seat 58 which may be a simple sheet of plywood with or without an upholstered covering. In FIG. 3 there may be seen the plan view of seat 58 showing a notch 59 which is provided so that seat 58 can be fastened to a tree trunk. In order to stabilize seat member 53 at a distance of 8-12 feet above the ground it is desirable to employ a flexible fastening means 60 encircling the tree trunk. This means may be a cable, a chain, a rubbery belt, or the like, preferably with a hook 61 at each end to engage an eye bolt 62 attached to each side of seat member 53. Angle braces 63 support seat member 53. Braces 63 are pivotable on shaft 64 through bushings 65 on braces 63. The other end of braces 63 is slideable into sockets 66 attached to legs 51 respectively. To secure braces 63 in sockets 66 there is a hole 67 through socket 66 and through brace 63 to receive spring clip 68 therethrough similar to the fastening shown in FIGS. 8 and 9. Seat member 53 is attached pivotally to the top ends of legs 51 by means of a shaft and bushings similar to 55, 56, and 45 described above. Bushings 69 are attached by welding to the top ends of legs 51. Bushings 70 are attached by welding to support 57 of seat member 53. Shaft 71 passes through bushings 69 and 70 to provide seat member 53 with a pivotal movement. It will be appreciated that when seat member 53 is folded against legs 51 and extension ladder section 27 is folded against lower portion 22 as shown in FIGS. 2 and 3 that seat 58 may function as a back rest for the driver of vehicle 20. In this folded position seat member 53 and braces 63 are conveniently held in place by wrapping flexible clamping member 60 around legs 51 and legs 23 with hooks 61 attached wherever it is convenient to do so.

In FIGS. 10 and 11 there is shown a second embodiment of this invention, one that is particularly useful as a lifeguard stand at a swimming location. In this instance the ladder structure is not extensible beyond its one length. The structure is built substantially the same as that of lower portion 22 described above with respect to FIGS. 2-5. A pair of forward legs 73 and a pair of rearward legs 74 are positioned in a rectangular pyramidal arrangement with rungs 78 and braces 79 attached laterally as previously described. The bottom of legs 73 is turned toward the rear to form feet 75 which can be attached to the luggage rack of a vehicle by U-bolt fasteners as described previously. Rear legs 74 have an attachment plate 76 with a plurality of holes 77 which provide means for adjustable attachment to the vehicle by a U-bolt fastener as described previously. Extension legs 80 inside rear legs 74 are adapted to slide telescopically to reach the ground or to be withdrawn into legs 74. Extension legs 80 are held in any selected position by means of aligning holes 81 in legs 74 with holes 82 in legs 80 and passing a spring clip 83 through the aligned holes. Each extension leg 80 has a broad ground engaging foot 84. At the top of the structure where legs 73 and 74 come close together there is a swivel seat 85 attached by means of shaft 86 and reinforcing washers 87. This structure also includes a rigid fixed horizontal platform 88 positioned at a convenient space below seat 85 to permit an observer to use seat 85 or to stand on platform 88 as desired.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A portable observation structure removably attachable to a wheeled vehicle comprising two pairs of upright legs in a rectangular pyramidal arrangement with the bottom of each of said legs releaseably attachable to said vehicle, a first pair of legs attachable adjacent the rear of said vehicle and a second pair of legs attachable spacedly rearward of said first pair, lateral rungs connecting said first pair of legs, telescopic extensions of said second pair of legs adapted to selectively be extended to reach the ground on which said vehicle rests, said pyramidal arrangement having a seat member attached to the upper end thereof.

2. The structure of claim 1 which additionally comprises an upper ladder section joined to the top of said pyramidal arrangement by a pivotal connection to permit folding of said upper section against said pyramidal arrangement, said upper section comprising two legs and spaced lateral rungs, and a pivotable seat member on the upper end of said upper section adapted to be moved to an operable position as a seat or optionally folded against said upper section.

3. The structure of claim 2 wherein said pyramidal arrangement comprises a first pair of forward legs which are removably attached to a position forward of the rear portion of said vehicle and a second pair of rear legs which are removably attachable to, and overhang, the rear portion of said vehicle and contain internally said telescopic extensions which are adjustable lengthwise to rest firmly on the ground on which said vehicle rests.

4. The structure of claim 1 which additionally comprises a platform adjacent the upper end of said pyramidal arrangement and adjacent said seat member, said platform being attached to the upper ends of said pairs of legs and adapted to permit an observer to sit on said seat member or stand on said platform without moving said seat member.

5. The structure of claim 4 wherein said seat member is a swivel seat.

6. The structure of claim 1 which additionally comprises a flexible elongated member attached to said seat member and adapted to encircle a tree trunk and to clamp said tree trunk tightly to said structure.

7. A portable observation structure adapted to be removably attached to the rear portion of a single seat all-terrain wheeled vehicle; said structure comprising four generally vertical legs in a rectangular pyramidal arrangement with a first pair of legs being attachable to said vehicle adjacent the rear portion thereof and a second pair of legs being attachable to said vehicle spacedly rearward of said first pair of legs and rearward of said vehicle; a plurality of rungs laterally attached in spaced arrangement to said first pair of legs; an extension ladder section of two extension legs and laterally attached rungs, the bottom of said extension ladder section being attached pivotally to the top of said structure and adapted to lie against said first pair of legs when pivoted downwardly; a seat member attached to the upper ends of said extension legs and being selectively foldable against said extension legs or extended rearwardly at an angle from said extension legs; and a flexible belt member attachable to said seat member and adapted to encircle a tree trunk to clamp it tightly to said seat member.

8. The structure of claim 7 wherein said second seat member is foldable against said extension legs and adapted to form a back rest for the driver of said vehicle when said extension ladder is in the downwardly folded position.

9. The structure of claim 7 wherein said second pair of legs contains internal telescopically slideable extension legs sufficiently extendable to reach the ground upon which said vehicle rests and to provide partial support to said structure.

10. The structure of claim 9 wherein each of said pair of extension legs has a broad lateral ground engaging foot on the bottom thereof.

11. The structure of claim 7 which is adapted to be fastened to a luggage rack attached to the rear portion of said vehicle, said four legs being attached to said rack by U-bolt fastening means.

12. A portable observation structure adapted to be removably attached to the rear portion of a single seat all-terrain wheeled vehicle, said structure comprising four generally vertical legs in a rectangular pyramidal arrangement with a first pair of legs being attachable to said vehicle adjacent the rear portion thereof and a second pair of legs being attachable to said vehicle spacedly rearward of said first pair of legs and rearward of said vehicle; a plurality of rungs laterally attached in spaced arrangement to said first pair of legs; a pair of telescopically slideable legs inside said second pair of legs and adapted to be extended downwardly to reach the ground behind said vehicle and to provide support for said seat and stand; releaseable fastening means to join each of said telescopic legs respectively to each of said second pair of legs in a nonslideable position of selected length; a seat member attached to the top of said pyramidal arrangement and a horizontal platform rigidly attached to said four vertical legs spacedly below said seat and adapted to provide support for a standing observer.

13. The structure of claim 12 wherein said seat member is a swivel seat.

14. The structure of claim 12 wherein each of said telescopically slideable legs has a broad ground engaging foot on the bottom thereof.

15. The structure of claim 12 wherein said releaseable fastening means is a spring clip with a pin adapted to slide through aligned holes in a leg of said second pair of legs and its internal telescopic slideable leg.

* * * * *